United States Patent [19]
Okubo

[11] Patent Number: 6,022,047
[45] Date of Patent: Feb. 8, 2000

[54] UNIVERSAL JOINT AND A YOKE THEREFOR FOR A STEERING APPARATUS

[75] Inventor: Kiyoshi Okubo, Maebashi, Japan

[73] Assignee: NSK Ltd., Tokyo, Japan

[21] Appl. No.: 08/519,614

[22] Filed: Aug. 25, 1995

[30] Foreign Application Priority Data

Sep. 9, 1994 [JP] Japan ................................. 6-215497

[51] Int. Cl.$^7$ ....................................... B62D 1/11
[52] U.S. Cl. .............................. 280/777; 74/493; 403/50; 403/57; 403/220; 464/180; 464/181; 280/779
[58] Field of Search .................................. 285/226, 903; 403/50, 57, 220, 223, 291; 464/69, 173, 180, 181; 280/777, 779; 74/493

[56] References Cited

U.S. PATENT DOCUMENTS

| | | | |
|---|---|---|---|
| 2,114,663 | 4/1938 | Erickson ................................... | 74/493 |
| 3,232,076 | 2/1966 | Sundt ................................... | 285/226 X |
| 3,401,576 | 9/1968 | Eckels ....................................... | 74/493 |
| 3,434,367 | 3/1969 | Renneker et al. ................... | 280/777 X |
| 3,482,466 | 12/1969 | Orlich et al. ......................... | 280/777 X |
| 3,754,411 | 8/1973 | Orain ....................................... | 74/493 X |
| 4,009,622 | 3/1977 | Hindericks ......................... | 280/777 X |
| 4,297,911 | 11/1981 | Grahn et al. ............................. | 280/777 |
| 5,018,899 | 5/1991 | Kuribara et al. ........................... | 403/57 |
| 5,222,913 | 6/1993 | Nagashima ......................... | 280/777 X |
| 5,259,818 | 11/1993 | Kachi et al. ......................... | 464/180 X |
| 5,293,973 | 3/1994 | Thum ....................................... | 188/377 |
| 5,503,431 | 4/1996 | Yamamoto .............................. | 280/777 |
| 5,740,699 | 4/1998 | Ballantyne et al. .................. | 74/490.06 |

FOREIGN PATENT DOCUMENTS

| | | | |
|---|---|---|---|
| 462443 | 12/1991 | European Pat. Off. ................ | 280/777 |
| 2 649 375 | 1/1991 | France . | |
| 2 655 110 | 5/1991 | France . | |
| 2 685 042 | 6/1993 | France . | |
| 22 12 713 | 9/1973 | Germany . | |
| 27 38 179 | 3/1979 | Germany . | |
| 34 46 749 | 7/1986 | Germany . | |
| 3711917 | 8/1988 | Germany ................................ | 280/777 |
| 38 28 665 | 3/1990 | Germany . | |
| 53-83231 | 7/1978 | Japan .................................... | 464/180 |
| 63-13634 | 1/1988 | Japan . | |
| 63-13863 | 1/1988 | Japan ...................................... | 74/493 |
| 3-41220 | 2/1991 | Japan . | |
| 5-155342 | 6/1993 | Japan . | |
| 522590 | 6/1940 | United Kingdom ................... | 285/226 |
| 1 358 370 | 7/1974 | United Kingdom . | |
| 2 236 063 | 3/1991 | United Kingdom . | |

*Primary Examiner*—Terry Lee Melius
*Assistant Examiner*—Andrea Chop
*Attorney, Agent, or Firm*—Vorys, Sater, Seymour and Pease LLP

[57] ABSTRACT

A yoke of a universal joint for a steering apparatus, the yoke including a coupling member made by press-shaping a metallic plate and formed into the shape of a tube having a split in a circumferential portion thereof and a serration on an inner peripheral surface thereof. The coupling member has one end portion, having a partially cylindrical portion and a pair of flange portions integral with the partially cylindrical portion with the split interposed therebetween, and a substantially cylindrical coupling portion at another end portion thereof. Notably, the substantially cylindrical coupling portion has a larger outer diameter than an outer diameter of the partially cylindrical portion. The coupling member further includes a threaded hole formed in one of the flange portions, and a through hole formed in the other of the flange portions and coaxial with the threaded hole for passing a bolt to be threadably engaged with the threaded hole. A coupling arm made by press-shaping a metallic plate into a U-shape and having coaxial circular holes in opposite end portions thereof and having a coupling portion on a base portion thereof is provided. A bellows has one end portion fitted onto and welded to the coupling portion of the coupling member and another end portion fitted onto and welded to the coupling portion of the coupling arm. The yoke can be made very durable and can provide good shock absorbing capability.

12 Claims, 7 Drawing Sheets

UNIVERSAL JOINT AND A YOKE THEREFOR FOR A STEERING APPARATUS

BACKGROUND OF THE INVENTION

1. Field of the Invention

This invention relates to a universal joint and a yoke therefor for a steering apparatus incorporated in the steering apparatus of an automobile and transmitting the movement of a steering shaft to a steering gear.

2. Related Background Art

The steering apparatus of an automobile is constructed as shown, for example, in FIG. 11 of the accompanying drawings. The movement of a steering wheel 1 is transmitted to a steering gear 4 through a steering shaft 2 and a connecting shaft 3, and the wheels are steered by the steering gear 4. It is often the case that the steering shaft 2 and the input shaft 5 of the steering gear 4 cannot be provided on the same straight line. Therefore, heretofore, the connecting shaft 3 has been provided between the shafts 2 and 5, and the opposite end portions of this connecting shaft 3 and the end portions of the steering shaft 2 and the input shaft 5 have been coupled together through universal joints 6 and 6 so that power transmission can be effected between the steering shaft 2 and the input shaft 5 which are not on the same straight line.

The universal joint 6 incorporated in such a power transmitting mechanism or the like has heretofore been comprised of first and second yokes 7 and 8 each formed into a bifurcated shape, and a cruciform shaft or spider 9 for displaceably coupling the yokes 7 and 8 together, as shown in FIG. 12 of the accompanying drawings. In the case of the universal joint shown in FIG. 12, the yokes are made by pressing a metallic plate. In Japanese Patent Application Laid-Open No. 3-41220, there is described a yoke as shown in FIGS. 13–14 and 15–16 of the accompanying drawings. Each of the yokes 10 described in the above-mentioned publication is constructed by fitting a coupling member 11 and a coupling arm 12 to each other, and welding them to each other.

The coupling member 11 is made into a tubular shape by press-shaping a metallic plate having sufficient rigidity, such as a carbon steel plate, and has a split 13 formed in a circumferential portion thereof and serrate grooves 14 formed in the inner peripheral surface thereof. Also, on one end portion (the left end portion as viewed in FIGS. 13 and 15) of the coupling member 11, a pair of flange portions 15 and 16 are provided integrally with the coupling member 11 with the split 13 interposed therebetween. These flange portions 15 and 16 are made thicker by gathering portions of the metallic plate constituting the coupling member 11 (the case of FIGS. 13–14) or by turning back a portion of the metallic plate by 180° (the case of FIGS. 15–16). One flange portion 15 (on the left as viewed in FIGS. 14 and 16) is formed with a threaded hole 17 and the other flange portion 15 (on the right as viewed in FIGS. 14 and 16) is formed with a through-hole 18. The threaded hole 17 and the through-hole 18 are formed coaxially with each other, and the inner diameter of the through-hole 18 is made sufficiently larger than the inner diameter of the threaded hole 17, whereby the fore end portion of a bolt inserted in the through-hole 18 is threadably engageable with the threaded hole 17.

The coupling arm 12 is also made by press-shaping a metallic plate having sufficient rigidity, such as a carbon steel, into a U-shape. The base portion of this coupling arm 12 is formed with a through-hole 19 and the opposite end portions of the coupling arm 12 are formed with coaxial circular holes 20 and 20, respectively.

Regarding the assembly of the coupling member 11 and coupling arm 12 constructed as described above, the other end portion (the right end portion as viewed in FIGS. 13 and 15) of the coupling member 11 is fitted in the through-hole 19 formed in the base portion of the coupling arm 12 and also, the outer peripheral surface of the other end portion of the coupling member 11 and the marginal edge portion of the through-hole 19 in the base portion of the coupling arm 12 are welded to each other thereby providing a yoke 10 for the universal joint. When such a yoke 10 is to be assembled to the universal joint and the end portion of the connecting shaft 3 (FIG. 11) is to be coupled to the yoke 10, a serrate portion formed on the end portion of the connecting shaft 3 is inserted into the coupling member 11, whereafter a bolt is inserted from the right, as viewed in FIGS. 14 and 16, into the through-hole 18 formed in the flange portion 16 and is threadably engaged with the threaded hole 17 formed in the flange portion 15, and is fastened. As a result, the yoke 10 and the end portion of the connecting shaft 3 are firmly coupled together.

Now, in order to alleviate a shock applied to a driver's body when, during a collision, the driver's body collides with the steering wheel 1, various safety mechanisms have been considered, including giving a shock alleviating capability to the universal joint portion. In order to meet such requirement, it has been considered to connect metallic bellows between the coupling member 11 and the coupling arm 12 in series with the two members 11 and 12 to give a shock alleviating capability to the universal joint including the yoke 10 shown in FIGS. 13 and 15.

That is, one end portion of the bellows is coupled to the outer peripheral surface of the other end portion of the coupling member 11 and the other end portion of the bellows is coupled to the base end portion of the coupling arm 12, both by welding. Under normal conditions, the bellows effects the transmission of a rotational force between the coupling member 11 and the coupling arm 12 to thereby make steering possible. In contrast, when an impact force in a direction of compression in the axial direction of the yoke is applied during a collision, the bellows is crushed to thereby prevent any change in the inclination of the steering wheel or the pressure from below the steering wheel, thus alleviating the shock applied to the driver's body.

However, when a metallic bellows is simply incorporated in the prior-art structure as shown in FIGS. 13 and 15, it is difficult to achieve both durability of the yoke and shock absorbing capability. That is, the yoke 10 constituting the universal joint for the steering apparatus is small and therefore the outer diameter of the coupling member 11 also is small. For this reason, when the metallic bellows is simply incorporated in the prior-art structure as shown in FIGS. 13 and 15, the diameter of the bellows also becomes small.

Under normal conditions, the bellows is subjected to stress in the direction of rotation each time the steering wheel 1 is operated and therefore, when the diameter thereof is small, internal strain becomes great and sufficient durability cannot be obtained. Of course, if the thickness of the bellows is made great, it will be possible to obtain durability, but it will become difficult for the bellows to be crushed on the occasion of a collision and shock absorbing capability will become insufficient. If the diameter of the bellows is made large without the thickness thereof being made great, sufficient durability and shock absorbing capability could be obtained. Therefore, it would be possible, for example, to fit and fix a cylindrical spacer to the end portion of the coupling member 11 and fit the end portion of the bellows to the outer peripheral surface of this spacer to thereby make the diameter of the bellows larger. However, the use of such a spacer means an increase in the number of parts and also leads to the cumbersomeness of the manufacture of parts, the custody of the parts and the assembling work, which in turn leads to an increase in the costs of the yoke with the bellows and the universal joint incorporating the yoke therein.

SUMMARY OF THE INVENTION

In view of such circumstances, the yoke of a universal joint for a steering apparatus according to the present invention has been invented to suppress an increase in the costs thereof and yet obtain sufficient durability and shock absorbing capability.

The yoke of a universal joint for a steering apparatus according to the present invention comprises a coupling member made by press-shaping a metallic plate and formed into the shape of a tube having a split in a circumferential portion thereof and a serration on an inner peripheral surface thereof. The coupling member includes one end portion, having a partially cylindrical portion and a pair of flange portions integral with the partially cylindrical portion with the split interposed therebetween, and a substantially cylindrical coupling portion at another end portion thereof. The substantially cylindrical coupling portion has a larger outer diameter than an outer diameter of the partially cylindrical portion.

The coupling member further includes a threaded hole formed in one of the flange portions, and a through hole formed in the other of the flange portions and coaxial with the threaded hole for passing a bolt to be threadably engaged with the threaded hole.

The yoke also comprises a coupling arm made by press-shaping a metallic plate into a U-shape and having coaxial circular holes in opposite end portions thereof and having a coupling portion on a base portion thereof. A bellows having one end portion fitted onto and welded to the coupling portion of the coupling member and another end portion fitted onto and welded to the coupling portion of the coupling arm is provided for shock absorbing capability.

In the case of the yoke of a universal joint for a steering apparatus according to the present invention constructed as described above, the substantially cylindrical coupling portion formed on the coupling member can be made sufficiently large as compared with the original outer diameter of the coupling member. Accordingly, the diameter of the bellows provided between the coupling member and the coupling arm can also be made sufficiently large. As a result, bellows of a small thickness and a large diameter can be used as the bellows to thereby obtain sufficient durability of the bellows and obtain shock absorbing capability.

DESCRIPTION OF THE PREFERRED EMBODIMENTS

Figure 1:
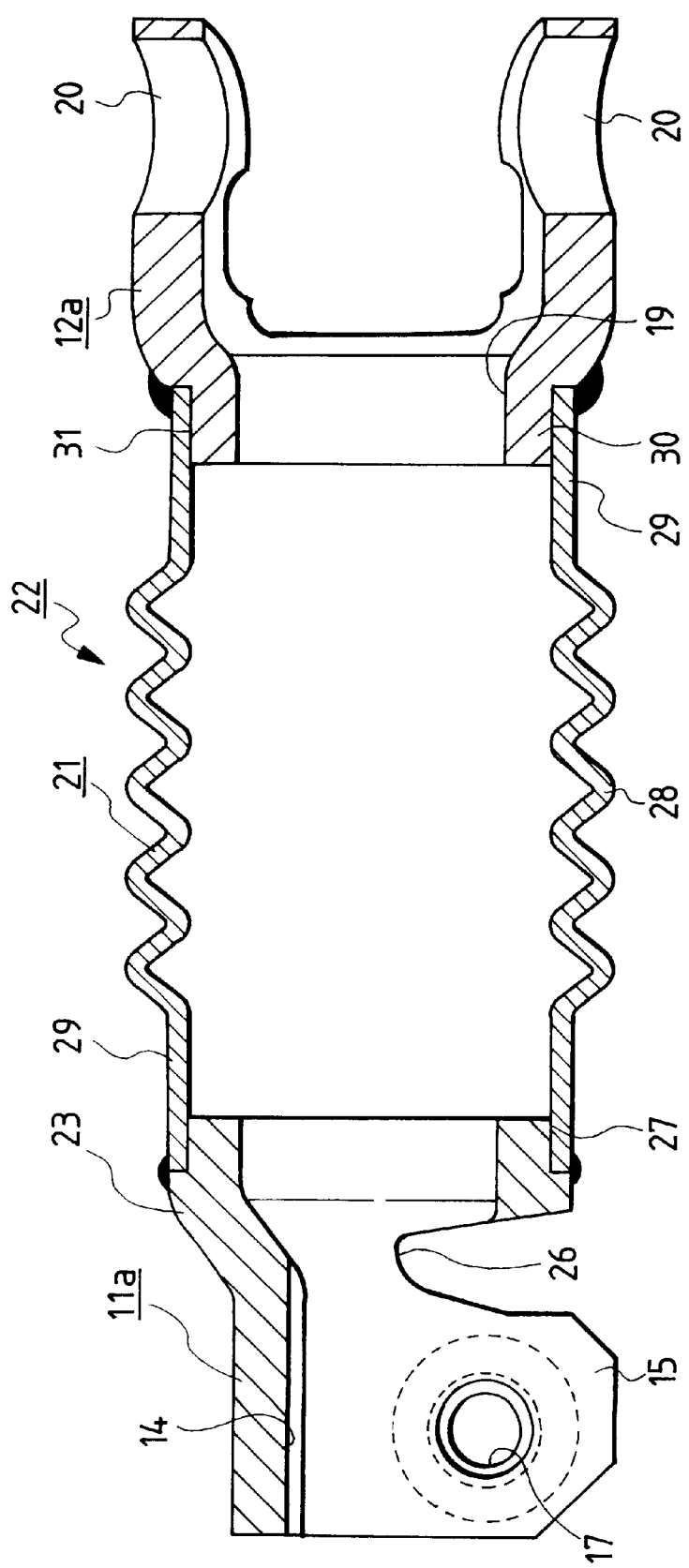
FIG. 1 is a cross-sectional view showing an embodiment of the present invention.

FIGS. 1 to 10 show an embodiment of the present invention. The yoke 22 of a universal joint for a steering apparatus according to the present invention, as shown in FIG. 1, comprises a coupling member 11a and a coupling arm 12a each made by press-shaping a metallic plate having sufficient rigidity, such as a thick carbon steel plate, and connected in series with each other with metallic bellow 21 interposed therebetween. The yoke 22 of the present invention is comprised of such three members 11a, 12a and 21 is incorporated into a universal joint with another yoke and a cruciform shaft to thereby constitute a steering apparatus.

Figure 2:
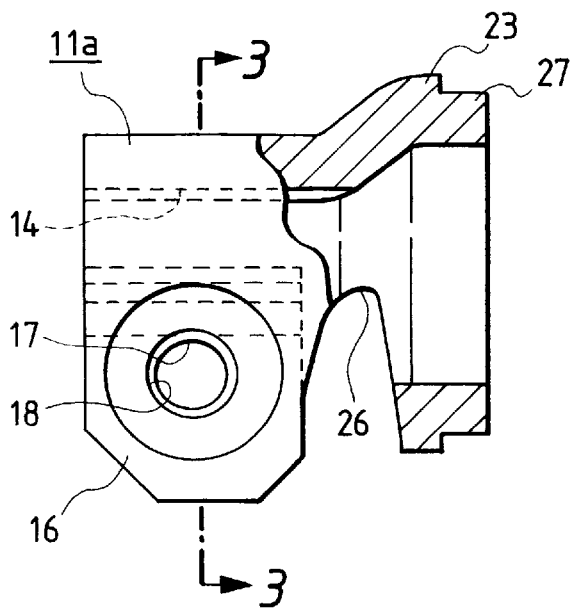
FIG. 2 is a side view partly in cross-section of a coupling member according to the present invention.
Figure 3:
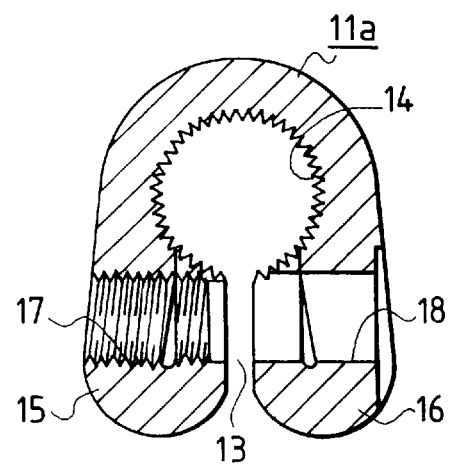
FIG. 3 is a cross-sectional view taken along the line 3—3 of FIG. 2.
Figure 4:
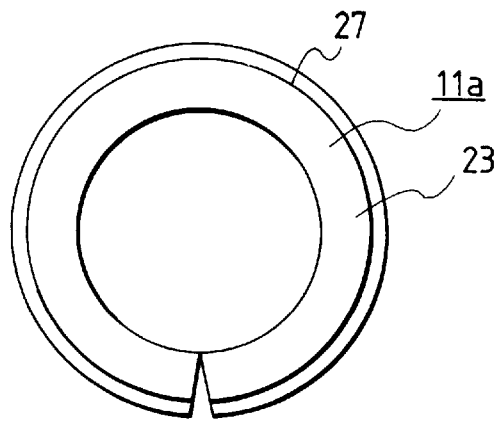
FIG. 4 shows the coupling member of FIG. 2 as seen from the right with some portions omitted.

The coupling member 11a, like the coupling member 11 (see FIGS. 13 to 16) of the prior-art yoke 10 described previously, is formed into the shape of a tube having a split 13 in a circumferential portion thereof and serrate grooves 14 on the inner peripheral surface thereof, as shown in FIGS. 2 to 4. One end portion (the left end portion as viewed in FIGS. 1 and 2) of the coupling member 11a has a pair of flange portions 15 and 16 with the split 13 interposed therebetween and a partially cylindrical portion. One flange portion 15 (on the left as viewed in FIG. 3) is formed with a threaded hole 17 and the other flange portion 16 (on the right as viewed in FIG. 3) is formed with a through-hole 18 coaxial with the threaded hole 17. A bolt is inserted in the through-hole 18 and threadably engaged with the threaded hole 17. Accordingly, the inner diameter of the through-hole 18 is larger than the inner diameter of the threaded hole 17 but smaller than the outer diameter of the head of the bolt.

Also, the other end portion (the right end portion as viewed in FIGS. 1 and 2) of the coupling member 11a is formed with a substantially cylindrical coupling portion 23. The substantially cylindrical coupling portion 23 has a larger outer diameter than the outer diameter of the partially cylindrical portion of the one end portion on which the serrate grooves 14 are formed and permits one end portion (the left end portion as viewed in FIG. 1) of the bellows 21 to be fitted to the outer peripheral surface thereof. The bellows 21 is made of a plastically deformable thin steel plate, such as carbon steel or stainless steel, and has a wavy portion 28 formed on the intermediate portion thereof and cylindrical portions 29 and 29 on the opposite end portions thereof.

Figure 5:
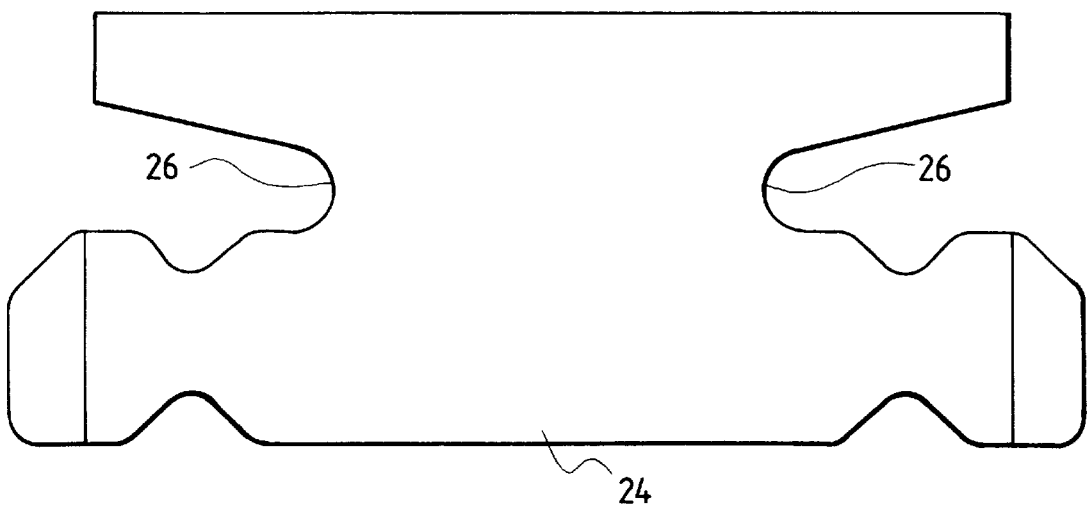
FIG. 5 is a plan view of a plate material for forming the coupling member.
Figure 6:
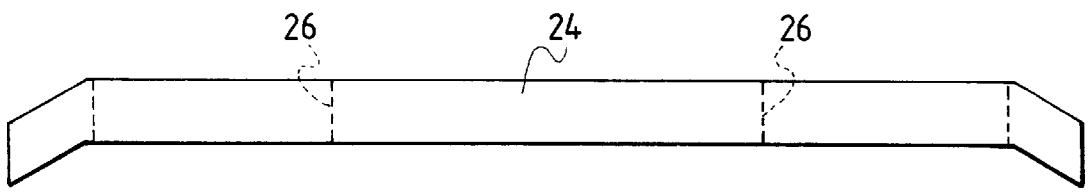
FIG. 6 is a view of the plate material of FIG. 5 as it is seen from below.
Figure 7:
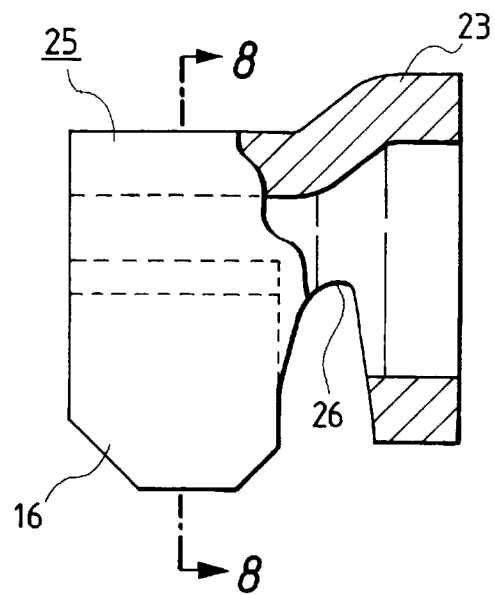
FIG. 7 is a side view partly in cross-section of a blank made from the plate material.
Figure 8:
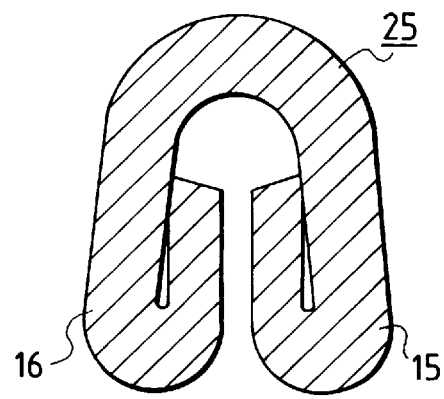
FIG. 8 is a cross-sectional view taken along the line 8—8 of FIG. 7.
Figure 9:
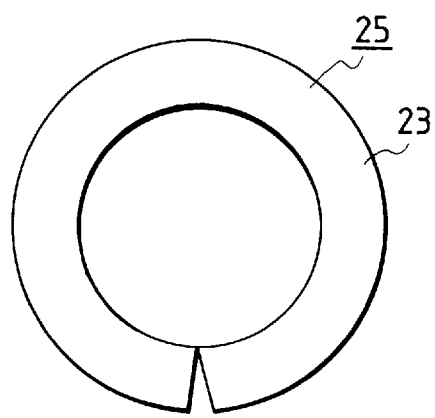
FIG. 9 shows the blank of FIG. 7 as seen from the right with some portions omitted.

When the coupling member 11a described above is to be made, a thick metallic plate is first punched to thereby make a plate material 24 as shown in FIGS. 5 and 6. This plate material 24 is rounded into the shape of a tube, and a portion thereof is turned back to thereby make a blank 25 as shown in FIGS. 7 to 9. Besides the flange portions 15 and 16, the substantially cylindrical coupling portion 23 of a large diameter is formed on this blank 25. A pair of cut-aways 26 and 26 are formed in the intermediate portion of the plate material 24 from the opposite end edges thereof and therefore, without the flange portions 15, 16 interfering with the substantially cylindrical coupling portion 23, the work of forming these portions 15, 16 and 23 can be done. Accordingly, the substantially cylindrical coupling portion 23 can be formed into an substantially cylindrical shape of a sufficiently large diameter and moreover, the pair of flange portions 15 and 16 can be made parallel to each other. When the blank 25 as described above is formed, the threaded hole 17 and the through-hole 18 are then formed in the flange portions 15 and 16 of the blank 25 to thereby provide the coupling member 11a as shown in FIGS. 2 to 4. Also, that portion of the outer peripheral surface of the substantially cylindrical coupling portion 23 which is near the fore end thereof is cut, such as by lathing, to thereby form a stepped portion 27 having a highly accurate substantially cylindrical surface. The outer diameter of this stepped portion 27 is made substantially equal to the inner diameter of the cylindrical portion 29 of the bellows 21. The difference between the outer diameter of the stepped portion 27 and the outer diameter of the remaining portion of the substantially cylindrical coupling portion 23 of the first coupling cylinder portion 23 is preferably of a degree corresponding to the thickness of the bellows 21.

Figure 10:
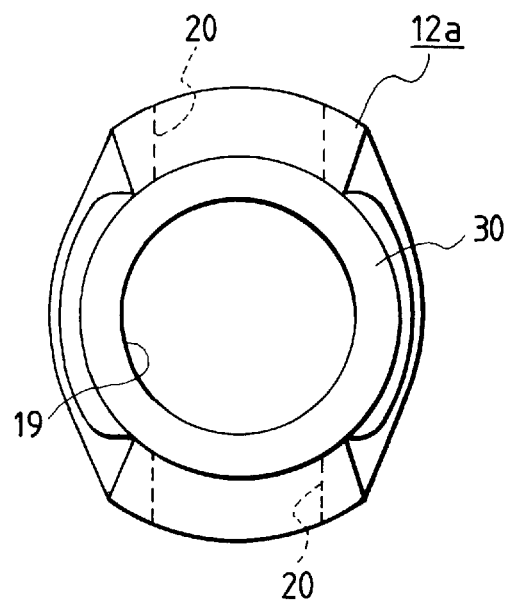
FIG. 10 shows the coupling arm of FIG. 1 as seen from the right with some portions omitted.
Figure 12:
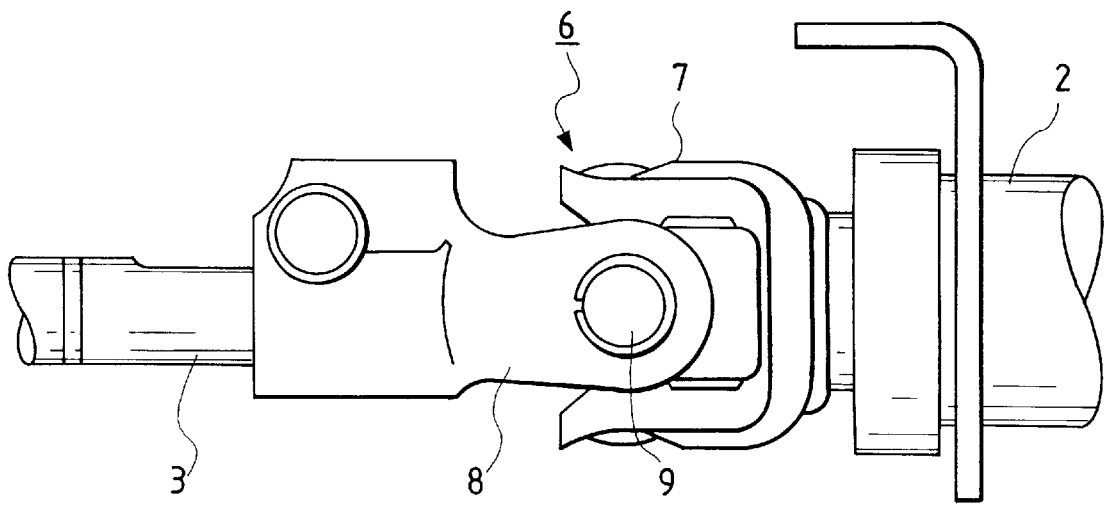
FIG. 12 is an enlarged view taken along the arrow C of FIG. 11 and showing a universal joint incorporating a prior-art yoke therein.

The coupling arm 12a is made into a shape as shown in FIGS. 1 and 10 by press-shaping a thick metallic plate into a U-shape. The opposite arm end portions of this coupling arm 12a are formed with circular holes 20 and 20 coaxial with each other. A bearing cup (not shown) containing therein a needle bearing for supporting the cruciform shaft 9 (FIG. 12) is fitted into and fixed to the circular holes 20 and 20. Also, a through-hole 19 is formed in the base end portion of the coupling arm 12a and the marginal edge portion of this through-hole 19 is formed into a cylindrical shape to thereby form a coupling cylinder portion 30. A stepped portion 31 having a highly accurate cylindrical surface is also formed on the outer peripheral surface of the coupling cylinder portion 30 by cutting work, such as lathing. The outer diameter of this stepped portion 31 is also made substantially equal to the inner diameter of the cylindrical portion 29 of the bellows 21.

To couple the coupling arm 12a constructed as described above and the coupling member 11a as described previously to each other through the bellows 21, the cylindrical portion 29 on one end side of the bellows 21 is fitted onto the coupling portion 23 and that portion of the outer peripheral surface of the coupling portion 23 which is near the base end thereof and one end edge of the bellows 21 are welded together, as shown in FIG. 1. Also, the cylindrical portion 29 on the other end side of the bellows 21 is fitted onto the coupling cylinder portion 30 and that portion of the outer peripheral surface of the coupling cylinder portion 30 which is near the base end thereof and the other end edge of the bellows 21 are welded together.

Figure 11:
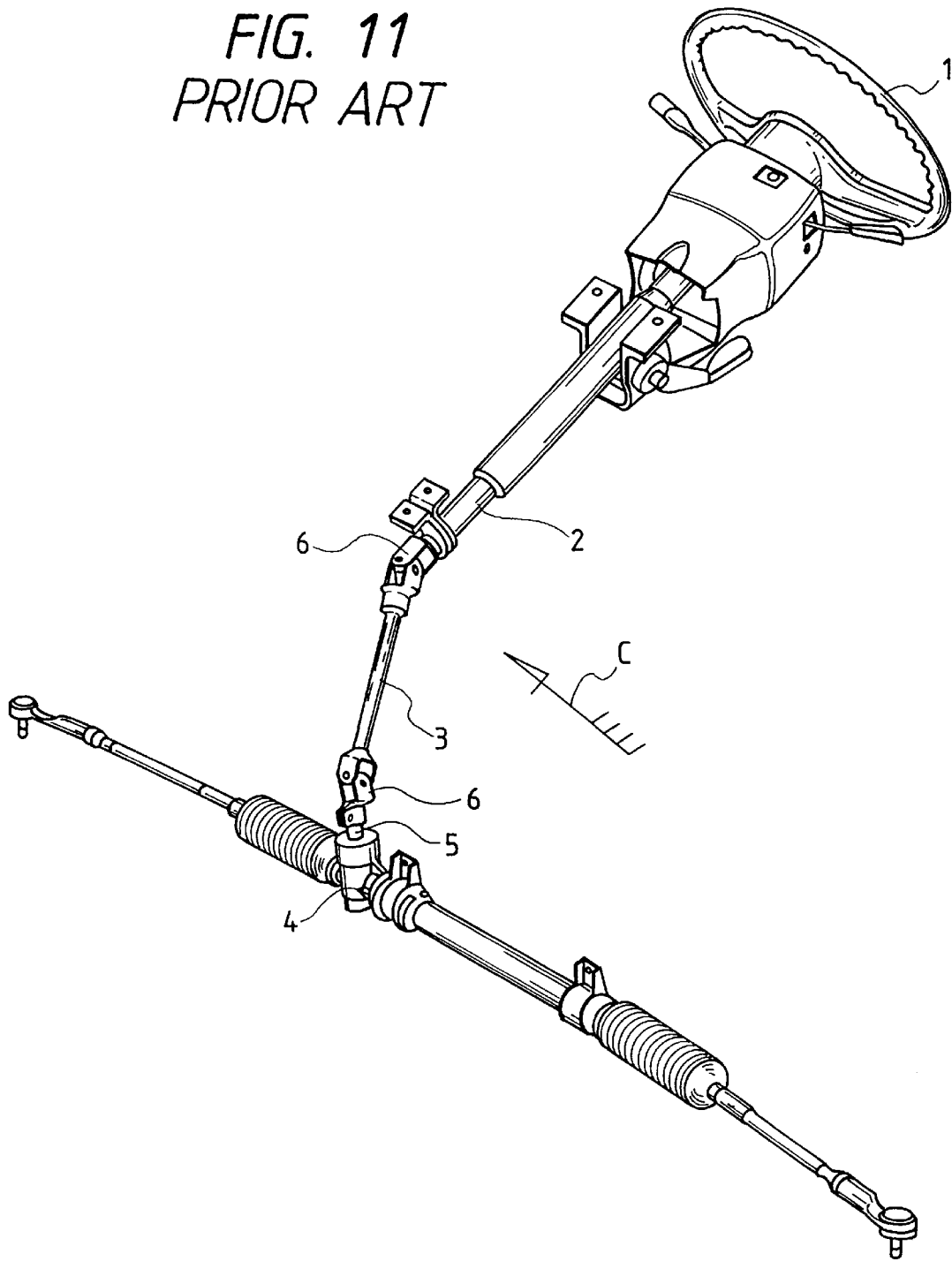
FIG. 11 is a perspective view of a steering apparatus incorporating a universal joint therein.

The yoke 22 made in this manner is coupled to another yoke through the cruciform shaft 9 (FIG. 12), like the prior-art yoke described previously, to thereby constitute a universal joint. This universal joint is incorporated into a steering apparatus as shown, for example, in FIG. 11, and transmits the movement of a steering wheel 1 to a steering gear 4. At this time, the bellows 21 transmits rotational movement. In the case of a collision, an impact force in a direction of compression in the axial direction (the left to right direction as viewed in FIG. 1) is applied to the yoke 22, and the bellows 21 is crushed (the full length is shortened) by this impact force. Thereby, any change in the inclination of the steering wheel 1 or pressure from below the steering wheel is prevented to alleviate the shock applied to a driver's body.

In the case of the yoke of a universal joint for a steering apparatus according to the present invention constructed and used as described above, the coupling portion 23 formed on the coupling member 11a can be made sufficiently large as compared with the original outer diameter of the coupling member 11a. Accordingly, the diameter of the bellows 21 provided between the coupling member 11a and the coupling arm 12a can also be made sufficiently large. As a result, bellows of a small thickness and a large diameter is used as the bellows 21, whereby sufficient durability of the bellows can be obtained and yet shock absorbing performance during collision can be obtained.

Figure 13:
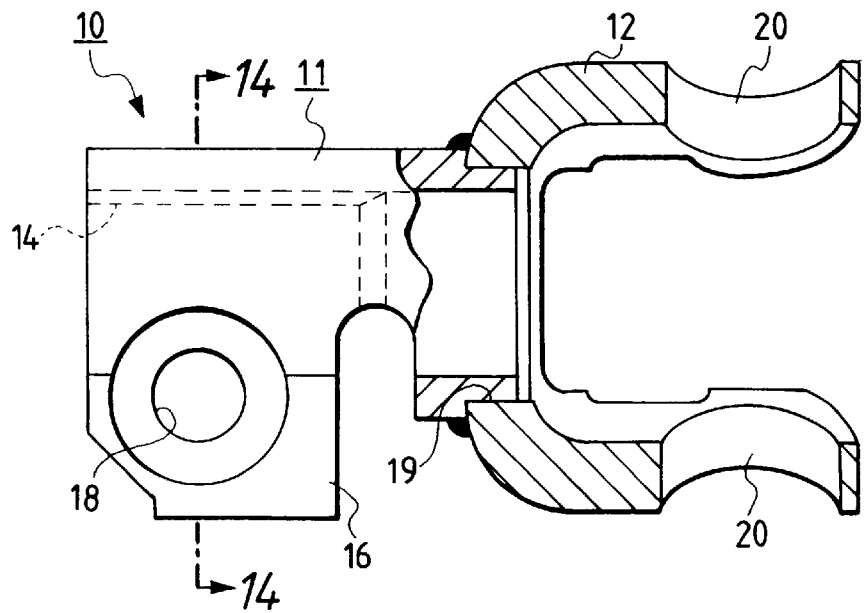
FIG. 13 is a side view partly in cross-section showing a second example of the prior-art yoke.
Figure 14:
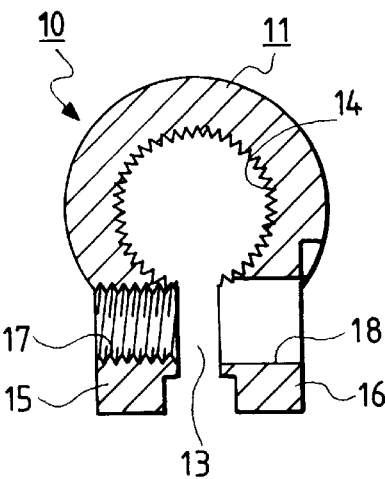
FIG. 14 is a cross-sectional view taken along the line 14—14 of FIG. 13.
Figure 15:
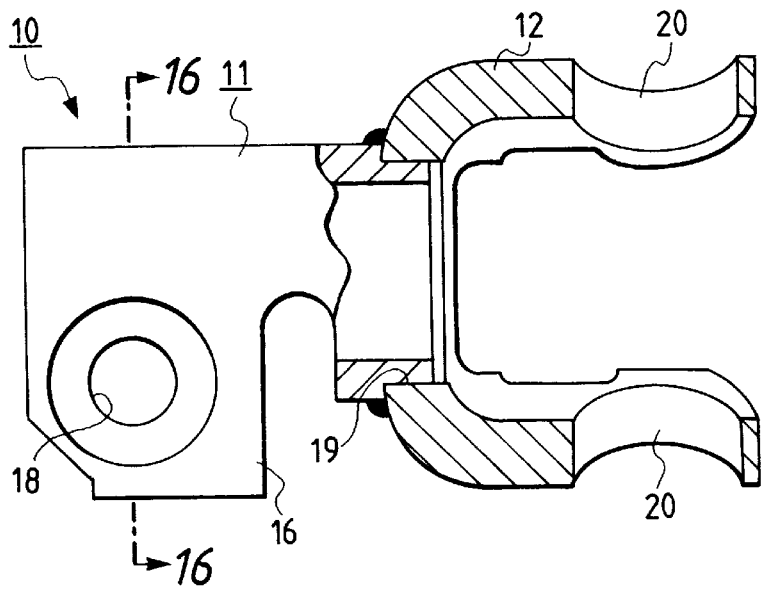
FIG. 15 is a side view partly in cross-section showing a third example of the prior-art yoke.
Figure 16:
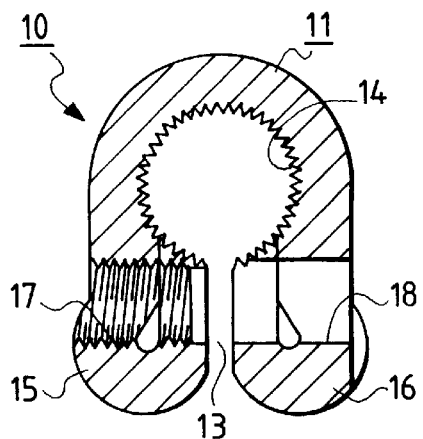
FIG. 16 is a cross-sectional view taken along the line 16—16 of FIG. 15.

In the shown embodiment, the pair of flange portions 15 and 16 are formed on the coupling member 11a by turning back a metallic plate by 180°, but alternatively these flanges 15 and 16 may be formed by gathering portions of the metallic plate constituting the coupling member 11a as in the prior-art structure shown in FIGS. 13 and 14. Also, the phase of the coupling member 11a and the phase of the coupling arm 12a can be freely set to thereby improve the assembly property of the universal joint as in the case of the prior-art structure shown in FIGS. 13 to 16.

The yoke of a universal joint for a steering apparatus according to the present invention is constructed and acts as described above and can therefore obtain the following effects:

(1) A bellows having of a small thickness and a large diameter is used as the bellows, whereby sufficient durability of the bellows can be obtained and yet shock absorbing performance during collision can be obtained;

(2) Accordingly, the goals of providing for the protection of the driver and reliability of the steering apparatus can be compatibly achieved; and (3) The coupling member formed by press-shaping a metallic plate and the bellows can be directly coupled together without the use of a discrete part such as a spacer and therefore, a reduction in manufacturing costs can be achieved by the simplification of the manufacture of parts, the custody of parts and the assembling work.

What is claimed is:

1. A yoke of a universal joint for a steering apparatus, said yoke comprising:

a coupling member made by press-shaping a metallic plate and formed into the shape of a tube having a split in a circumferential portion thereof and a serration on an inner peripheral surface thereof, said coupling member including one end portion, having a partially cylindrical portion and a pair of flange portions integral with said partially cylindrical portion with said split interposed therebetween, and a substantially cylindrical coupling portion at another end portion thereof, and substantially cylindrical coupling portion having a larger outer diameter than an outer diameter of said partially cylindrical portion, said coupling member further including a threaded hole formed in one of said flange portions, and a through hole formed in the other of said flange portions and coaxial with said threaded hole for passing a bolt to be threadably engaged with said threaded hole;

a coupling arm made by press-shaping a metallic plate into a U-shape and having coaxial circular holes in opposite end portions thereof and a substantially cylindrical, axially projecting coupling portion on a base portion thereof, said base portion having an axial through hole therein and said axially projecting coupling portion having an outer diameter larger than a diameter of said axial through hole; and a bellows having one end portion fitted onto and welded to said coupling portion of said coupling member and another end portion fitted onto and welded to said axially projecting coupling portion of said coupling arm.

2. The yoke of a universal joint according to claim 1, wherein said coupling member is a one-piece member.

3. The yoke of a universal joint according to claim 1, wherein said axially projecting coupling portion of said coupling arm has an outer diameter substantially equal to the outer diameter of said coupling portion of said coupling member.

4. The yoke of a universal joint according to claim 3, wherein said coupling member is a one-piece member.

5. A steering apparatus of an automobile, comprising a steering wheel, a steering shaft connected to the steering wheel, a steering gear mechanism for steering wheels, and a connecting mechanism including a universal joint connecting the steering shaft and the steering gear mechanism and transmitting rotation of the steering shaft to the steering gear mechanism, wherein said universal joint comprises a yoke including a coupling member and a coupling arm, and bellows connecting said coupling member and said coupling arm in series with each other, said coupling member being formed into the shape of a tube having a split in a circumferential portion thereof and a serration on an inner peripheral surface thereof, said coupling member including one end portion, having a partially cylindrical portion and a pair of flange portions integral with said partially cylindrical portion with said split interposed therebetween, and a substantially cylindrical coupling portion at another end portion thereof, said substantially cylindrical coupling portion having a larger outer diameter than an outer diameter of said partially cylindrical portion, said coupling member further including a threaded hole formed in one of said flange portions, and a through hole formed in the other of said flange portions and coaxial with said threaded hole for passing a bolt to be threadably engaged with said threaded hole, said coupling arm being made by press-shaping a metallic plate into a U-shape and having coaxial circular holes in opposite end portions thereof and a substantially cylindrical, axially projecting coupling portion on a base portion thereof and onto which the other end portion of said bellows can be fitted, said base portion having an axial through hole therein and said axially projecting coupling portion having an outer diameter larger than a diameter of said axial through hole, one end portion of said bellows being fitted onto and welded to said coupling portion of said coupling member and another end portion being fitted onto and welded to said axially projecting coupling portion of said coupling arm, whereby during collision of the automobile, an impact force of compression applied in an axial direction of the steering apparatus may be absorbed by crushing the bellows.

6. The steering apparatus according to claim 5, wherein said coupling member is a one-piece member.

7. The steering apparatus according to claim 5, wherein said axially projecting coupling portion of said coupling arm has an outer diameter substantially equal to the outer diameter of said coupling portion of said coupling member.

8. The steering apparatus according to claim 7, wherein said coupling member is a one-piece member.

9. A yoke of a universal joint for a steering apparatus, said yoke comprising:

a coupling member made by press-shaping a metallic plate and formed into the shape of a tube having a split in a circumferential portion thereof and a serration on an inner peripheral surface thereof, said coupling member including one end portion, having a partially cylindrical portion and a pair of flange portions integral with said partially cylindrical portion with said split interposed therebetween, and a substantially cylindrical coupling portion at another end portion thereof, said substantially cylindrical coupling portion having a larger outer diameter than an outer diameter of said partially cylindrical portion, said coupling member further including a threaded hole formed in one of said flange portions, and a through hole formed in the other of said flange portions and coaxial with said threaded hole for passing a bolt to be threadably engaged with said threaded hole;

a coupling arm made by press-shaping a metallic plate into a U-shape and having coaxial circular holes in opposite end portions thereof and a substantially cylindrical, axially projecting coupling portion on a base portion thereof, said base portion having an axial through hole therein and said axially projecting coupling portion having an outer diameter larger than a diameter of said axial through hole; and a bellows having one end portion received by said coupling portion of said coupling member and another end portion received by said axially projecting coupling portion of said coupling arm.

10. The yoke of a universal joint according to claim 9, wherein said coupling member is a one-piece member.

11. The yoke of a universal joint according to claim 9, wherein said one end portion of said bellows is received on an outer surface of said coupling portion of said coupling member, said another end portion of said bellows is received on an outer surface of said axially projecting coupling portion of said coupling arm, and said axially projecting coupling portion of said coupling arm has an outer diameter substantially equal to the outer diameter of said coupling portion of said coupling member.

12. The yoke of a universal joint according to claim 11, wherein said coupling member is a one-piece member.

* * * * *